United States Patent
Nakamura (10) Patent No.: US 7,559,565 B2
(45) Date of Patent: Jul. 14, 2009

(54) SUSPENSION RESTRAIN DEVICE

(75) Inventor: Kenji Nakamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 171 days.

(21) Appl. No.: 11/653,282

(22) Filed: Jan. 16, 2007

(65) Prior Publication Data

US 2007/0164535 A1 Jul. 19, 2007

(30) Foreign Application Priority Data

Jan. 17, 2006 (JP) ............... 2006-008619

(51) Int. Cl.
*B62K 11/00* (2006.01)
(52) U.S. Cl. ................... 280/276; 188/300
(58) Field of Classification Search ............... 70/95; 188/30; 180/443; 194/235; 74/564, 473.25; 280/276
See application file for complete search history.

(56) References Cited

U.S. PATENT DOCUMENTS

| | | | | |
|---|---|---|---|---|
| 1,646,463 A | * | 10/1927 | Stokesberry | 285/409 |
| 3,574,862 A | * | 4/1971 | Jones | 2/2.15 |
| 4,225,104 A | * | 9/1980 | Larson | 248/125.8 |
| 4,754,624 A | * | 7/1988 | Fleming et al. | 70/95 |
| 4,911,573 A | * | 3/1990 | Pietro | 403/349 |
| 5,542,720 A | * | 8/1996 | Fleming | 292/32 |
| 2004/0055839 A1 | * | 3/2004 | Meret | 188/300 |

FOREIGN PATENT DOCUMENTS

JP 59-223583 A 12/1984

* cited by examiner

*Primary Examiner*—Paul N Dickson
*Assistant Examiner*—Levon Fiore
(74) *Attorney, Agent, or Firm*—Birch, Stewart, Kolasch & Birch, LLP (57) ABSTRACT

A telescopic suspension system that journals a front wheel can be held at a predetermined contracted state when a race is started. A holding device is provided with an automatic release mechanism that automatically releases an extension regulation when the telescopic suspension system is contracted more than the predetermined contraction percentage. A re-regulation prohibiting device prohibits re-regulation during operation after the release of an extension regulation by the operation of the automatic release mechanism. The holding device extend through an outer tube of suspension system and engages an inner tube to maintain the contracted state.

6 Claims, 11 Drawing Sheets

SUSPENSION RESTRAIN DEVICE

CROSS-REFERENCE TO RELATED APPLICATIONS

The present application claims priority under 35 USC 119 to Japanese Patent Application No. 2006-008619 filed on Jan. 17, 2006 the entire contents of which are hereby incorporated by reference.

BACKGROUND OF THE INVENTION

1. Field of the Invention

The present invention relates to two- and three-wheeled vehicles. More particularly, to two- and three-wheeled vehicles where a telescopic suspension system that journals a front wheel can be held at predetermined contraction percentage when a race is started.

2. Description of Background Art

Two- and three-wheeled vehicles are known wherein a telescopic suspension system is held at a predetermined contraction percentage when a race is started and a condition in which the predetermined contraction percentage is released by operating a lever provided to a steering handlebar during operation after a start. See, JP-A No. S59-223583.

However, the telescopic suspension system disclosed in JP-A No. S59-223583 requires a releasing operation by the lever to release the predetermined contraction percentage. It is desirable that such operation be omitted in a race. In addition, the telescopic suspension system disclosed in JP-A No. S59-223583 requires a cable connecting a holding device attached to the telescopic suspension system and the lever. However, it is ideally desirable in the two- and three-wheeled vehicles used for a race that such a part be omitted.

SUMMARY AND OBJECTS OF THE INVENTION

It is an object of an embodiment of the present invention to provide two- and three-wheeled vehicles where a predetermined contraction percentage of a telescopic suspension system is held at start with a part such as a cable not required and the predetermined contraction percentage can be automatically released after the start. Thus, re-regulation during operation after the release of extension regulation can be prohibited.

To achieve the object, an embodiment of the present invention provides a holding device for enabling the regulation of the extension of a telescopic suspension system that journals a front wheel at a predetermined contraction percentage attached to the telescopic suspension system. The holding device includes an automatic release mechanism that automatically releases the extension regulation when the telescopic suspension system is contracted more than the predetermined contraction percentage. A re-regulation prohibiting device prohibits re-regulation during operation after the release of extension regulation by the operation of the automatic release mechanism.

In addition, an embodiment of the present invention provides the telescopic suspension system with an outer tube and an inner tube fitted to the outer tube so that the inner tube can be slid. The holding device is provided with a supporting member attached to the outer tube so that the supporting member can be detached. In addition, a slide member pierces the outer tube so that the slide member can be moved. The slide member is supported by the supporting member so that the slide member can be slid. At an end of the slide member a fitting part can be fitted to the inner tube. The automatic release mechanism has a fitting hole into which the fitting part of the slide member is inserted and fitted when the telescopic suspension system is at the predetermined contraction percentage. The automatic release mechanism is provided to the inner tube in a shape enabling releasing the fitting of the fitting part when the telescopic suspension system is contracted more than the predetermined contraction percentage. Pressing members press the slide member on the side on which the fitting part is separated from the fitting hole.

Further, an embodiment of the present invention provides that the slide member is fitted to the supporting member so that the slide member can be slid between a forward position, where the fitting part is inserted into the fitting hole, and a backward position, where the fitting part is located outside the outer periphery of the inner tube. The re-regulation prohibiting device is provided with the slide member, a turning member fitted to the outer periphery of the slide member so that the turning member can be turned and a guide mechanism provided between the slide member and the turning member for determining an axial position of the slide member according to the turning of the turning member. The guide mechanism is configured wherein the movement of the slide member in a direction fitted to the inner tube is obstructed when the turning member is not turned in a state in which the fitting of the slide member to the inner tube is released.

A front fork 15 in the following embodiment is equivalent to the telescopic suspension system according to the invention and first and second springs 59, 60 in the following embodiment are equivalent to the pressing members according to the invention.

According to an embodiment of the present invention, an extension regulation is automatically released by the function of the automatic release mechanism with which the holding device is provided when the telescopic suspension system is contracted more than the predetermined contraction percentage after start. An operation, except steering, is not required during operation of the vehicle. In addition, a part such as a lever and a cable is not required. In addition, since re-regulation during operation after the release of extension regulation is prohibited by the function of the re-regulation prohibiting device with which the holding device is provided, a condition in which the predetermined contraction percentage is released can be securely maintained during operation after the extension regulation is released.

Further, according to an embodiment of the present invention, the holding device can be attached to the telescopic suspension system so that the holding device can be detached. In general during operation except during a race, the holding device can be detached. In addition, the telescopic suspension system is held at the predetermined contraction percentage by inserting and fitting the fitting part at the end of the slide member into the fitting hole provided to the inner tube and the slide member is slidably supported by the supporting member attached to the outer tube so that the supporting member can be detached. Thus, the attachment and the detachment of the holding device are easy.

Further, according to an embodiment of the present invention, re-regulation during operation after the release of the extension regulation can be securely prohibited by the re-regulation prohibiting device having a simple and compact configuration that is provided with the slide member, the turning member fitted to the slide member and the guide mechanism provided between the slide member and the turning member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring to the attached drawings, one embodiment of the invention will be described below.

Figure 1:
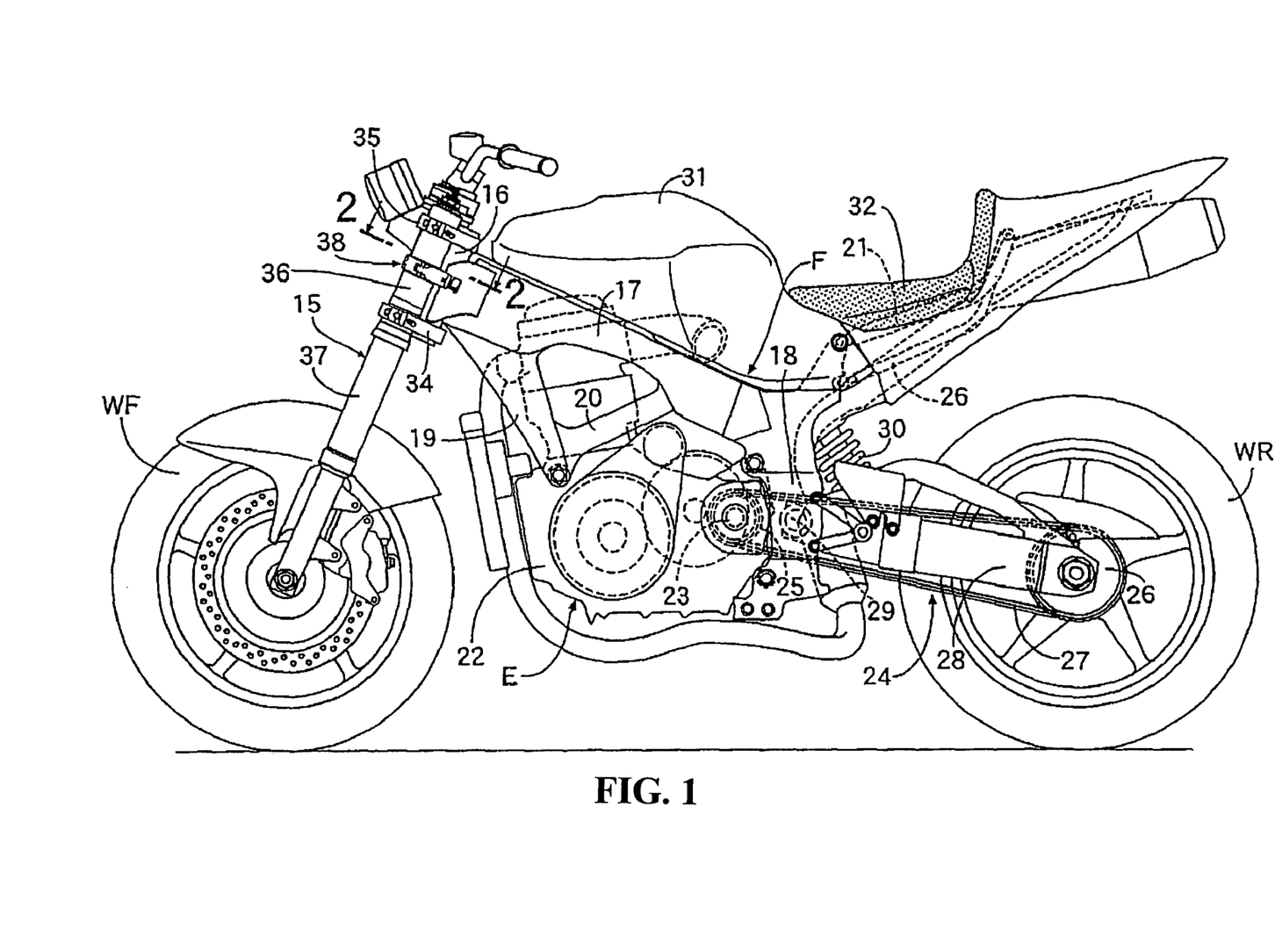
FIG. 1 is a side view showing a motorcycle.

As illustrated in FIG. 1, a body frame F of the motorcycle is provided with a head pipe 16 for supporting the front fork 15 which is a telescopic suspension system for journaling a front wheel WF so that the front fork can be steered. A pair of right and left main frames 17 extend rearwardly and downwardly from the head pipe 16. Pivot plates 18 are connected to rear ends of the main frames 17 and extend downwardly. Hanger plates 19 extend rearwardly and downwardly from each front of the main frames 17. Reinforcing frames 20 connect lower parts of the hanger plates 19 and intermediate parts of the main frames 17. Seat rails 21 extend rearwardly and upwardly from upper parts of the pivot plates 18.

A body 22 of a single-cylinder internal combustion engine E is mounted on the body frame F. More specifically, the front of the body 22 is supported by lower parts of the hanger plates 19, an upper part on the rear side of the body 22 is supported by upper parts of the pivot plates 18, and a lower part on the rear side of the body is supported by lower parts of the pivot plates 18.

Motive power from an output shaft 23 of a transmission built in the body 22 is transmitted to a rear wheel WR via a chain transmission device 24. The chain transmission device 24 is configured by a driving sprocket 25 fixed to the output shaft 23, a driven sprocket 26 fixed to the rear wheel WR and a looped chain 27 wound on the sprockets 25, 26.

Front ends of swing arms 28 are supported by the pivot plates 18 via a spindle 29 so that the swing arms can swing. The rear wheel WR is journaled by rear ends of the swing arms 28. A rear shock absorber 30 is provided between the fronts of the swing arms 28 and the body frame F.

A fuel tank 31 is mounted on the main frames 17 so that the fuel tank covers the internal combustion engine E and a seat for a rider 32 arranged at the back of the fuel tank 31 for the rider to ride is supported by the seat rails 21.

Figure 2:
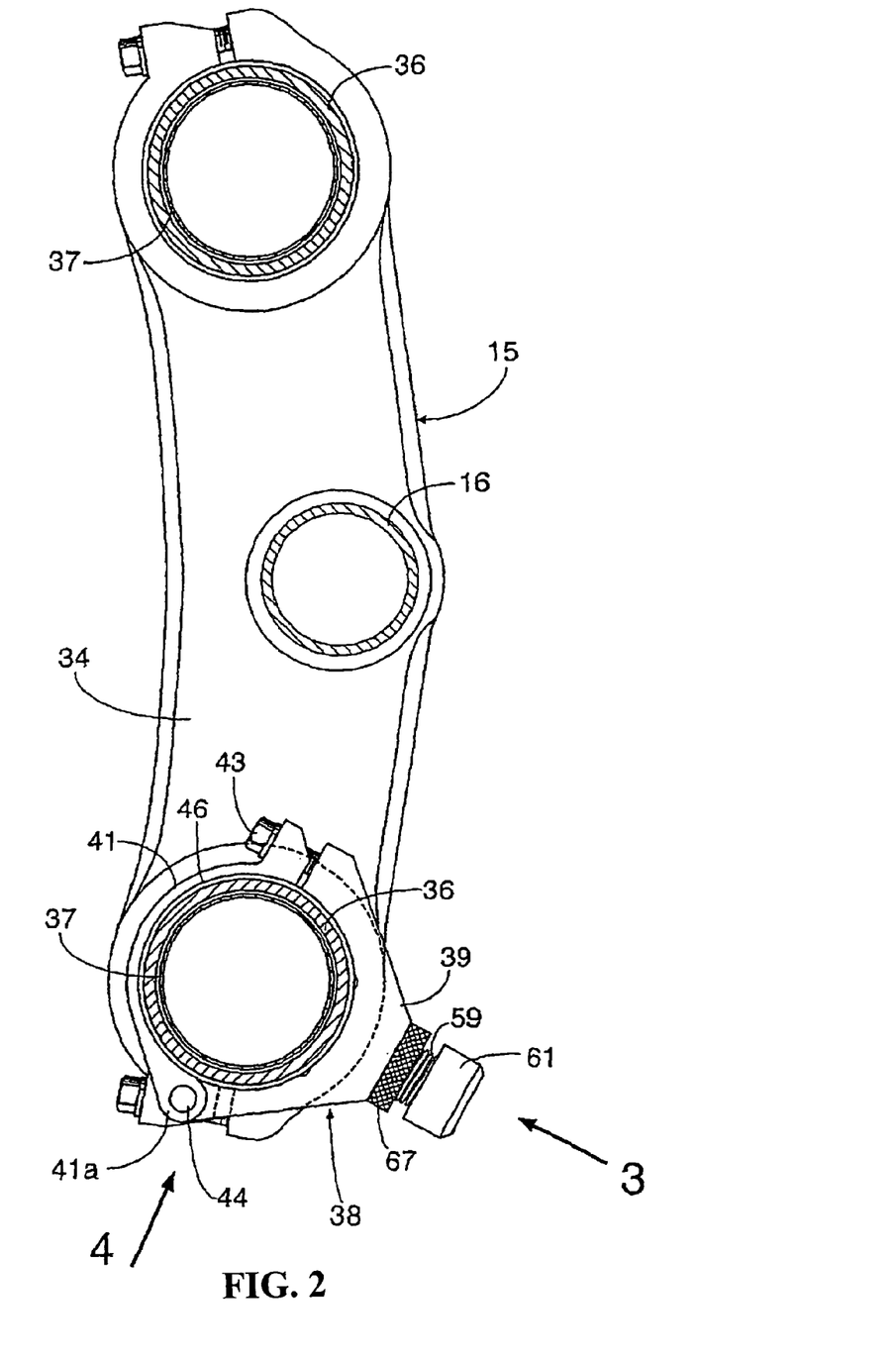
FIG. 2 is an enlarged sectional view viewed along a line 2-2 shown in FIG. 1.
Figure 3:
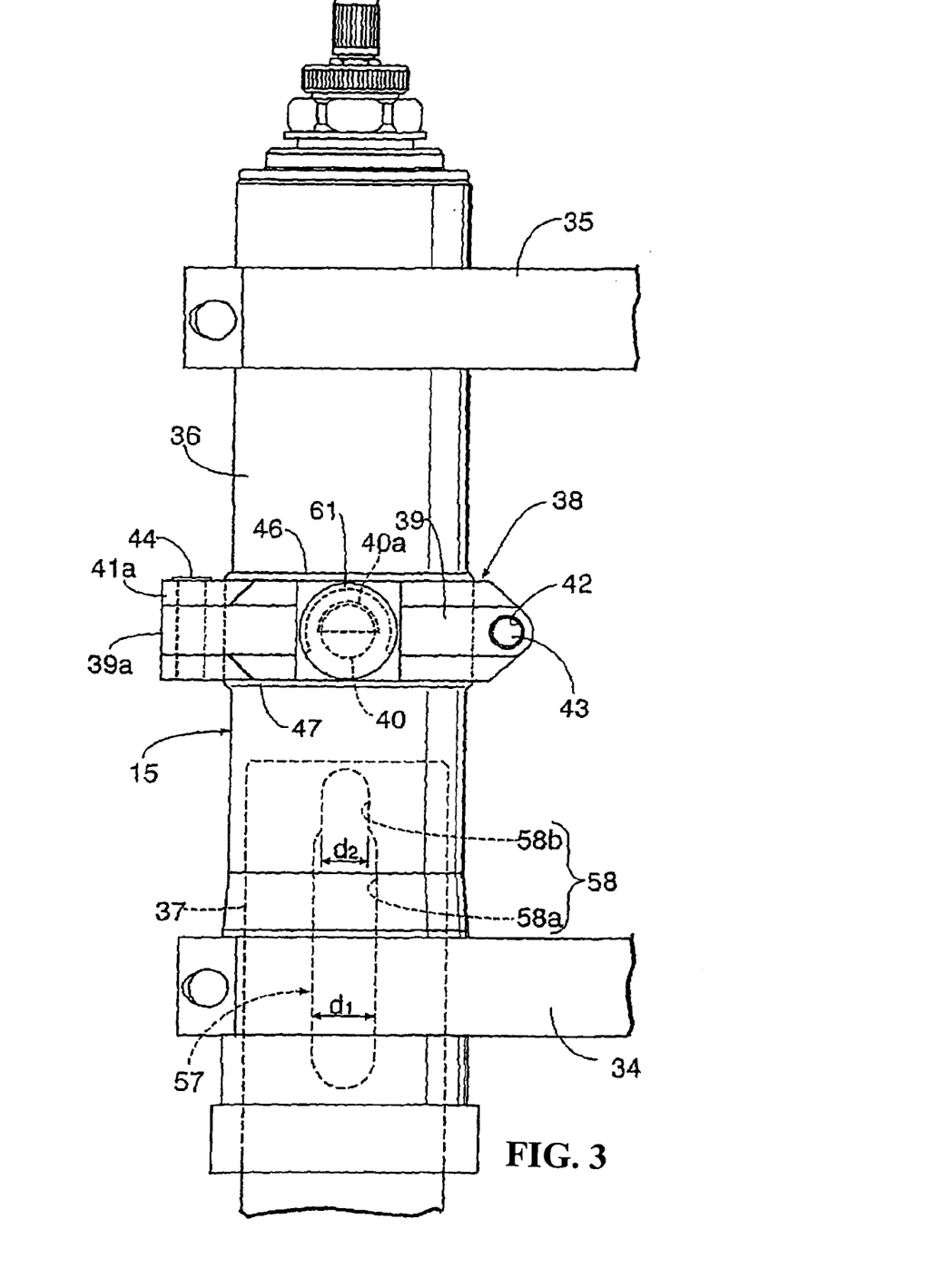
FIG. 3 is a view viewed from a direction shown by an arrow 3 in FIG. 2.
Figure 4:
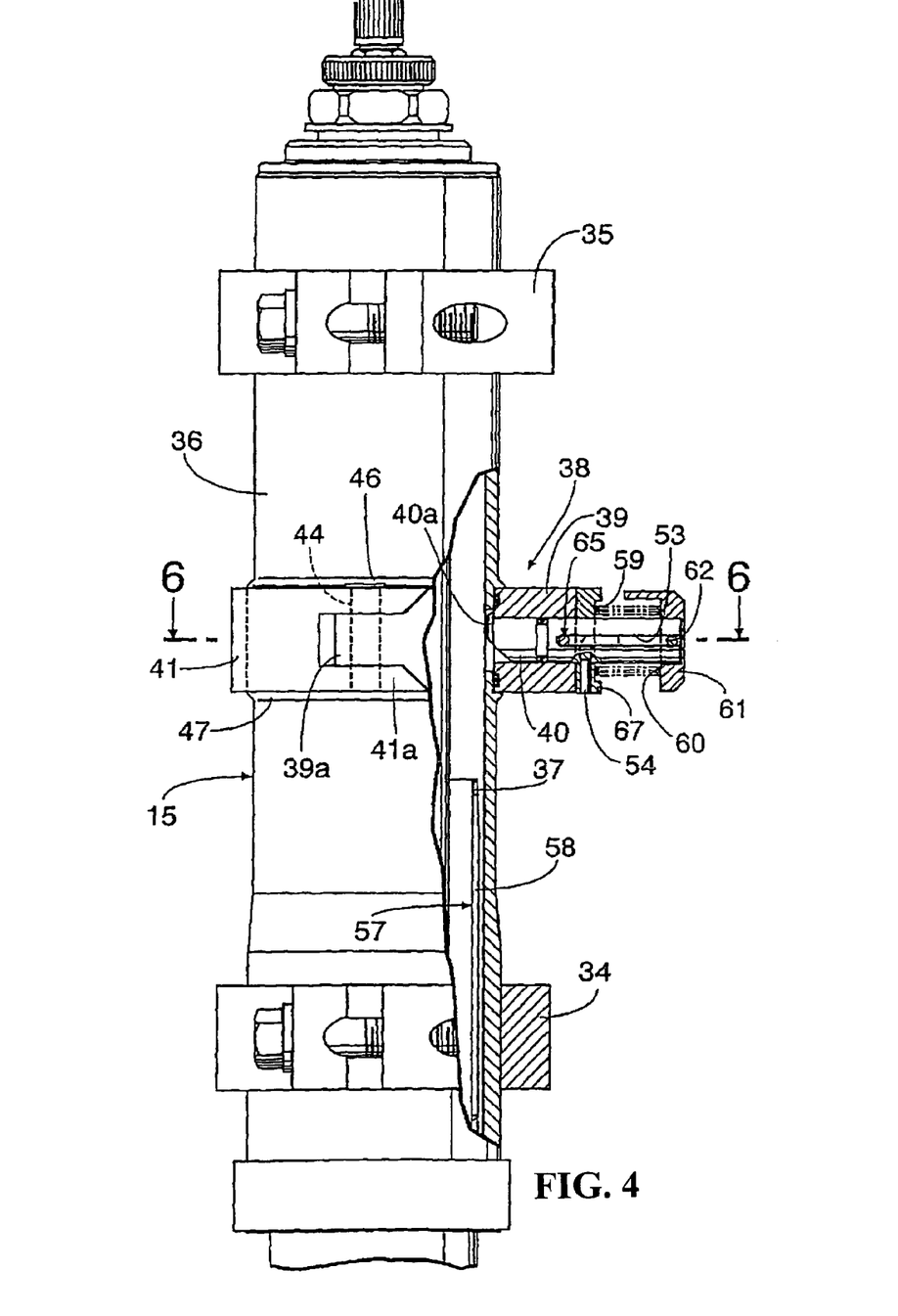
FIG. 4 is a view viewed from a direction shown by an arrow 4 in FIG. 2 in which a part is cut.

As illustrated in FIG. 2, the front fork 15 is provided with a bottom bridge 34 supported by the head pipe 16 of the body frame F so that the bottom bridge can be turned. A top bridge 35 is arranged above the bottom bridge 34 and supported by the head pipe 16 so that the top bridge can be turned. A pair of right and left outer tubes 36, 36 are arranged on both sides of the head pipe 16 and attached to the bottom bridge 34 and the top bridge 35. A pair of right and left inner tubes 37, 37 is fitted to the outer tubes 36 from the downside so that the inner tubes can be slid. The elements are formed in a so-called vertical type.

A holding device 38 for regulating the extension of the front fork 15 at the predetermined contraction percentage is attached to one of both outer tubes 36, the outer tube 36 located on the left side of the head pipe 16 in a traveling direction of the motorcycle in this embodiment between the bottom bridge 34 and the top bridge 35.

Also referring to FIGS. 3 to 6, the holding device 38 is provided with a supporting member 39 attached to the outer tube 36 so that the supporting member can be detached. A slide member 40 is provided which pierces the outer tube 36 so that the slide member can be moved and is supported by the supporting member 39 so that the slide member can be slid. At the end of the slide member, a fitting part 40a is provided that can be fitted to the inner tube 37.

The supporting member 39 has an inner circumference corresponding to substantially a half of the outer periphery of the outer tube 37, a coupling part 39a is provided to one end in a circumferential direction of the supporting member 39, and a tapped hole 42 is provided to the other end in the circumferential direction of the supporting member 39. A bolt 43 is inserted into the tapped hole 42 at one end in a circumferential direction of a nipping member 41 having an inner circumference corresponding to the remaining substantially half of the outer periphery of the outer tube 37 and a forked coupling part 41a for vertically nipping the coupling part 39a of the supporting member 39 is provided to the other end in the circumferential direction of the nipping member 41. In addition, the coupling part 39a of the supporting member 39 and the coupling part 41a of the nipping member 41 are mutually coupled via a coupling pin 44 having an axis parallel to the outer tube 37.

As a result, the supporting member 39 is fixed to the outer tube 36 by tightening the bolt 43 screwed into the tapped hole 42. The supporting member 39 can be detached from the outer tube 36 by unfastening and removing the bolt 43 from the tapped hole 42. The supporting member 39 is attached to the outer tube 36 so that the supporting member can be detached.

A flat fitting plane 45 and a pair of raised portions 46, 47 for vertically holding the fitting plane 45 are provided to the outer tube 36 in a part corresponding to the center in a peripheral direction of the supporting member 39. The supporting member 39 is attached to the outer tube 36 with the inner circumference touching the fitting plane 45, being held between both raised portions 46, 47.

A through hole 48 between the fitting plane 45 and an inner face of the outer tube 36 is provided to the outer tube 36 and a circular sealing member 49 elastically touching the fitting plane 45 surrounding the through hole 48 is mounted on the supporting member 39. Further, a sliding hole 50 having a smaller diameter than the through hole 48 is provided to the supporting member 39 coaxially with the through hole 48. The slide member 40 has a circular cross section which is formed cylindrically and is fitted into the sliding hole 50 so that the slide member can be axially slid. A circular sealing member 51 elastically touches an inner face of the sliding hole 50 and is mounted on the outer periphery of the slide member 40.

A lower part of the end of the slide member 40 is cut so that an inclined face 52 inclined diagonally upwardly toward the center side of the outer tube 36 is formed. The end face of the slide member 40 is made semicircular because the inclined face 52 is formed, and the fitting part 40a becomes like a flange pushed out radially outside from the end of the slide member 40.

Figure 5:
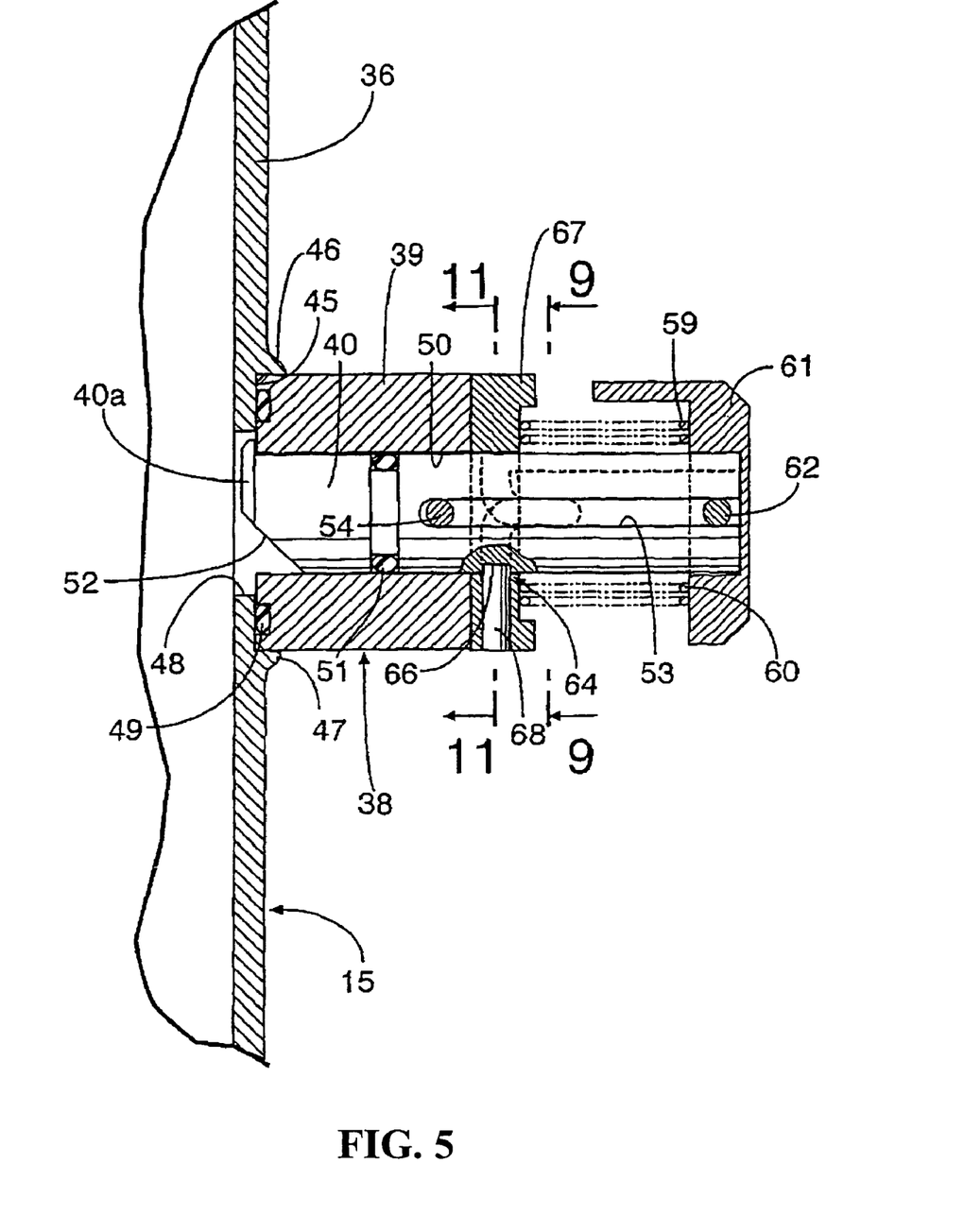
FIG. 5 is an enlarged view showing a main part of a part shown in FIG. 4.
Figure 6:
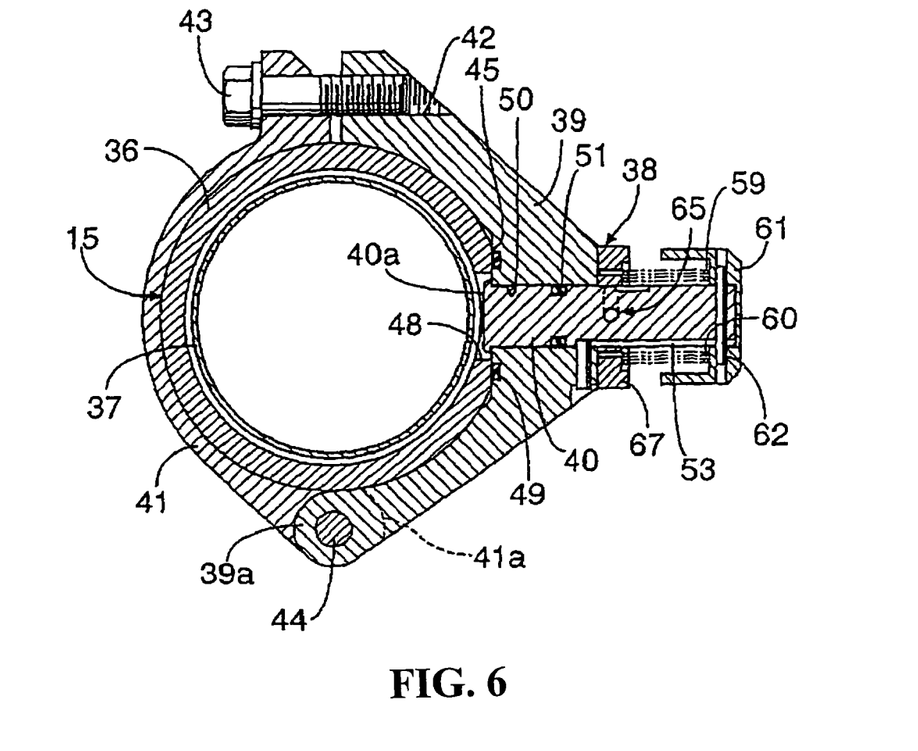
FIG. 6 is a sectional view viewed along a line 6-6 shown in FIG. 4 in which the internal structure of a front fork is omitted.

As a result, the slide member 40 is fitted into the sliding hole 50 so that the slide member can be slid between a forward position where the fitting part 40a at the end is advanced to the inside of the inner tube 37 and is fitted to the inner tube 37 and a rearward position where the fitting part 40a is located outside the outer periphery of the inner tube 37 and is touching and fitted to the supporting member 39 as shown in FIGS. 5 and 6. In addition, one fitting groove 53 axially extends and is provided on the outer periphery of the slide member 40 and a fitting pin 54 for being fitted into the fitting groove 53 is inserted into the supporting member 39. Hereby, the slide member 40 can be axially slid with an axial rotation disenabled and is fitted into the sliding hole 50.

Figure 7:
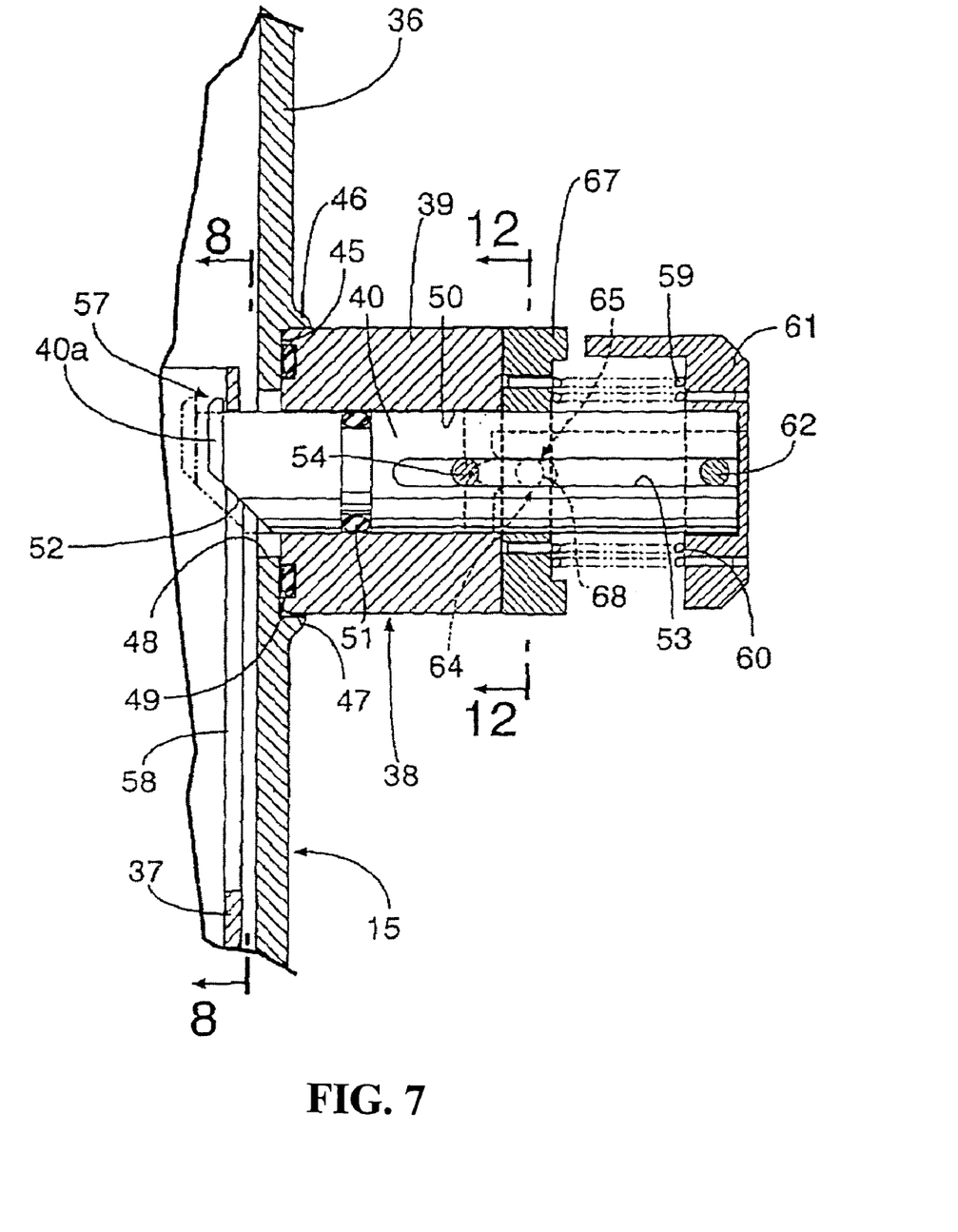
FIG. 7 corresponds to FIG. 5 and shows a condition in which predetermined contraction percentage is held by a holding device.
Figure 8:
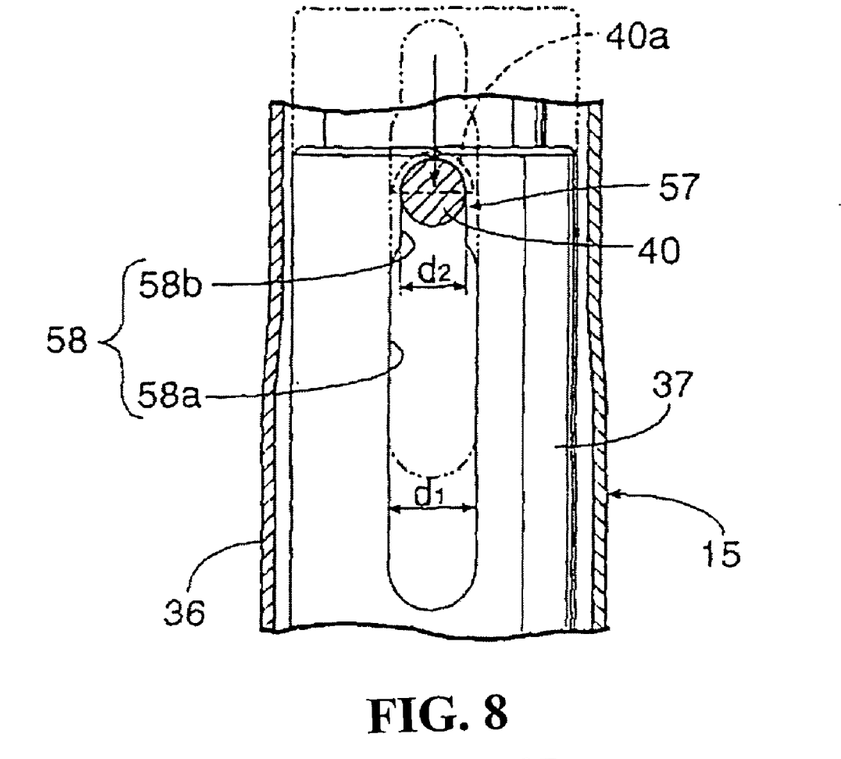
FIG. 8 is a sectional view viewed along a line 8-8 shown in FIG. 7.

Also referring to FIGS. 7 and 8, the holding device 38 is provided with an automatic release mechanism 57 that automatically releases an extension regulation when the front fork 15 is contracted more than the predetermined contraction percentage. The automatic release mechanism 57 makes the fitting part 40a of the slide member 40 inserted and fitted when the front fork 15 is at the predetermined contraction percentage and makes the fitting of the fitting part 40a releasable when the front fork 15 is contracted more than the predetermined contraction percentage. The automatic release mechanism includes a fitting hole 58 provided to the inner tube 37 and first and second springs 59, 60 provided on the side on which the fitting part 40a is withdrawn from the fitting hole 58 for pressing the slide member 40.

The fitting hole 58 is formed long in an axial direction of the inner tube 37 in a part corresponding to the slide member 40, and is configured by a wide part 58a which vertically extends at width d1 enabling the end including the fitting part 40a of the slide member 40 to be inserted and a lower end of which is closed and a narrow part 58b which is formed at narrow width d2 smaller than the wide part 58a to an extent that the fitting part 40a is inserted and fitted and which is connected to an upper end of the wide part 58a. The width d2 of the narrow part 58b is set to a required value to insert the slide member 40 except the fitting part 40a and the narrow part 58b is formed so that it is shorter than the wide part 58a and its upper end is closed.

As a result, as shown by a chain line in FIG. 8, when the slide member 40 is pushed into the wide part 58a of the fitting hole 58 in a state in which the front fork 15 is contracted, the end including the fitting part 40a of the slide member 40 is moved into the wide part 58a. When a force that contracts the front fork 15 is released in this condition, the fitting part 40a of the slide member 40 is inserted and fitted into the narrow part 58b by the extension of the front fork 15 as shown in FIGS. 7 and 8, and in a state in which the fitting part 40a is inserted and fitted into the narrow part 58b, it is regulated that the front fork 15 is extended more.

A cap 61 is fixed to an outer end of the slide member 40 projecting from the supporting member 39 by a set pin 62 along a diameter line of the slide member 40. In the meantime, a turning member 67, fitted to the outer periphery of the slide member 40 so that the turning member can be turned and opposite to the cap 61, contacts the supporting member 39, and the first and second springs 59, 60 which are coil springs are doubly provided between the cap 61 and the turning member 67.

The holding device 38 is also provided with a re-regulation prohibiting device 65 for prohibiting re-regulation during operation after the release of an extension regulation by the operation of the automatic release mechanism 57. The re-regulation prohibiting device 65 is provided with the slide member 40, the turning member 67 and a guide mechanism 64 provided between the slide member 40 and the turning member 67 for determining an axial position of the slide member 40 according to the operation of the turning member 67.

One end of the first and second springs 59, 60 is fitted to the cap 61 with the other end of the first and second springs 59, 60 is fitted to the turning member 67. The first and second springs 59, 60 not only apply a spring force for pressing the slide member 40 on the side opposite the fitting part 40a but apply a spring force for pressing the turning member 67 in a circumferential direction as shown by an arrow 69.

Figure 9:
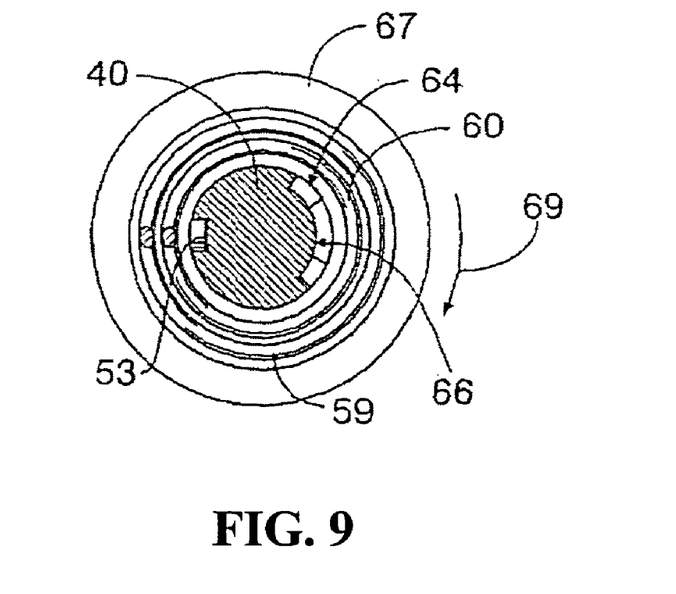
FIG. 9 is a sectional view viewed along a line 9-9 shown in FIG. 5.

As shown in FIG. 9, the guide mechanism 64 is configured by a guide groove 66 provided on the outer periphery of the slide member 40 and a pin 68 on the turning member and an end of which is fitted into the guide groove 66.

Figure 10:
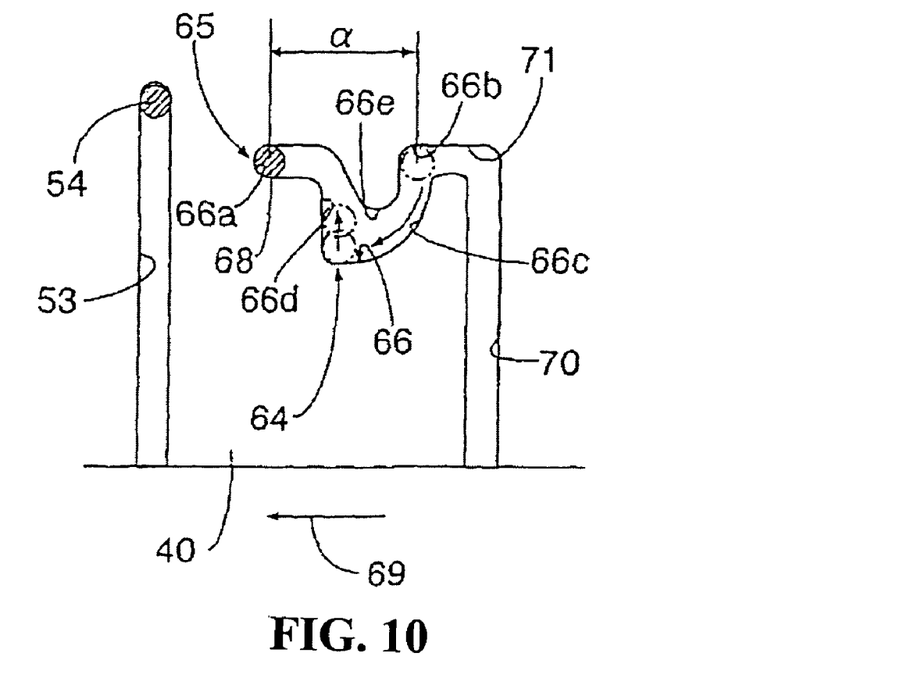
FIG. 10 is a development showing a guide groove.

The guide groove 66 is provided on the outer periphery of the slide member 40 in a range of an angle α in a circumferential direction of the slide member 40. The groove has an initial position 66a set on the side of one end of a direction 69 pressed by the first and second springs 59, 60, a setup position 66b set at the other end of the pressed direction 69, a pushing guide part 66c and a locking guide part 66d between the setup position 66b and the initial position 66a and sequentially set from the side of the setup position 66b.

Figure 11:
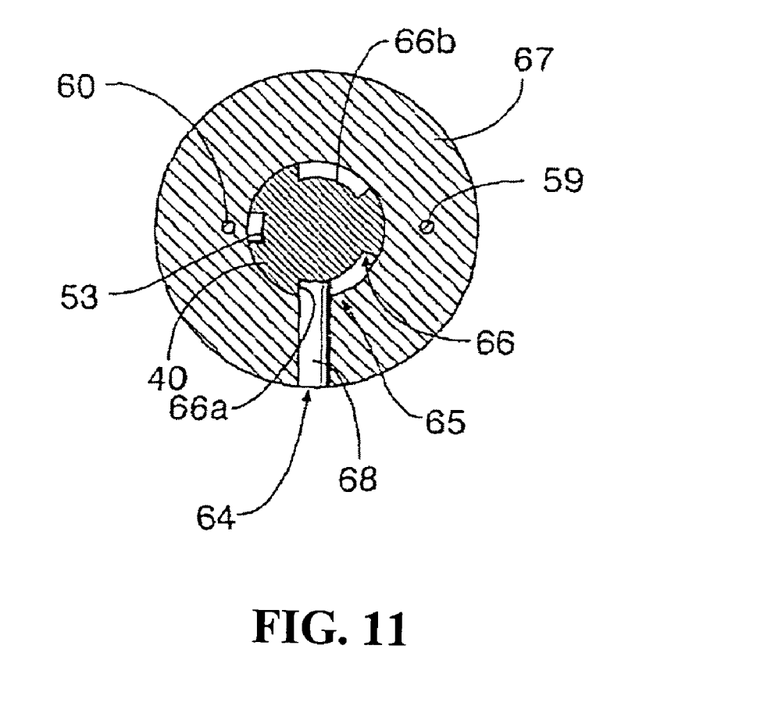
FIG. 11 is a sectional view viewed along a line 11-11 shown in FIG. 5.
Figure 12:
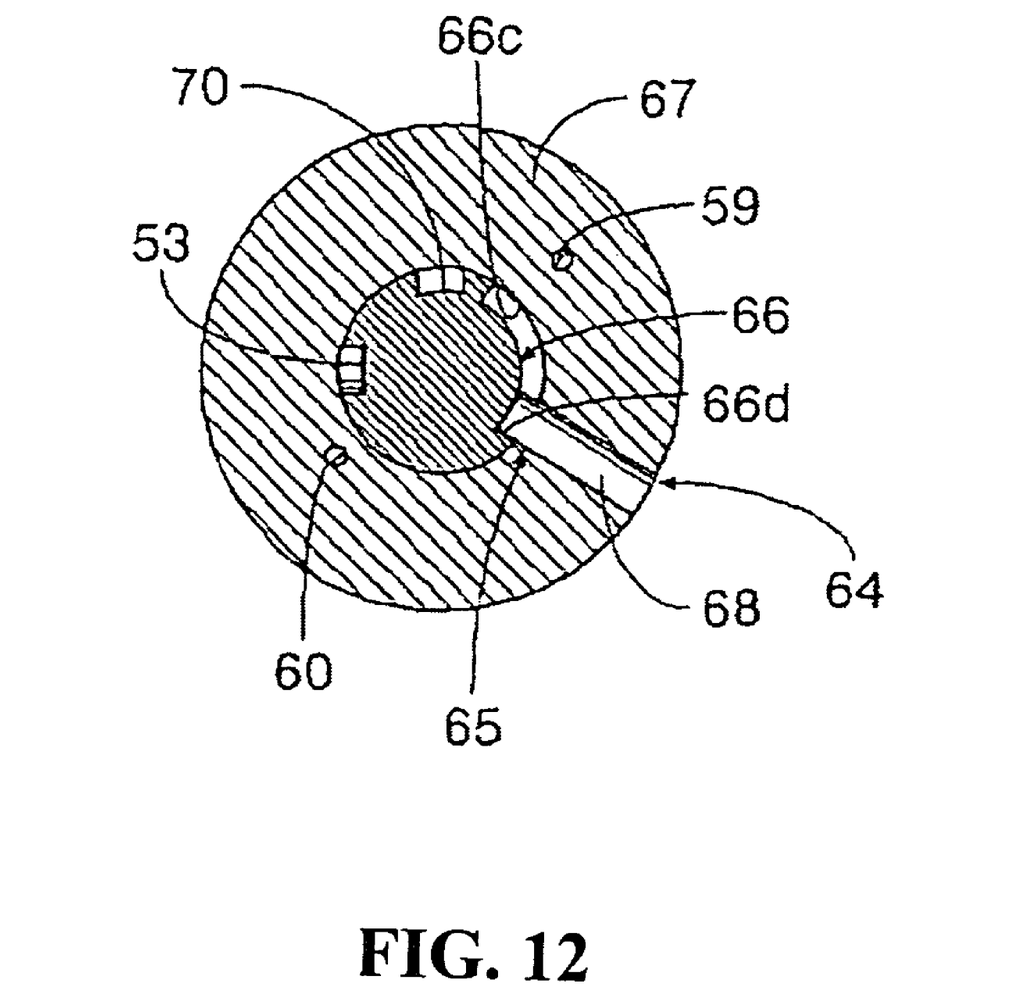
FIG. 12 is a sectional view viewed along a line 12-12 shown in FIG. 7.

The initial position 66a is formed so that the pin 68 is fitted in a state in which the fitting part 40a is located outside the inner tube 37. Movement of the turning member 67 and the pin 68 in the circumferential direction is regulated as shown in FIGS. 10 and 11. The setup position 66b is at a position apart by a predetermined angle α from the initial position 66a in the circumferential direction and is the same as the initial position 66a as to an axial position of the slide member 40.

The pushing guide part 66c is formed so that the pin 68 is guided in an axial direction of the slide member 40 from the setup position 66b by the spring force of the first and second springs 59, 60, as the guide member 40 is pushed in a state in which the pin 68 is located in the setup position 66b.

The locking guide part 66d is formed so that the movement of the pin 68 in one circumferential direction is regulated in which the fitting part 40a is fitted into the narrow part 58b of the fitting hole 58. The pin 68 is guided to the initial position 66a and the fitting part 40a is released from the fitting hole 58 because the fitting part 40a moves into the wide part 58a.

In addition, a front side wall 66e forming the pushing guide part 66c and the locking guide part 66d is formed in a curve swollen on the rear side. The slide member 40 moves further in the axial direction along the front side wall after the slide member 40 is moved rearwardly when the turning member 67 is turned in the circumferential direction against the spring force of the first and second springs 59, 60 and the pin 68 moves from the initial position 66a to the setup position 66b.

According to such a re-regulation prohibiting device 65, when the slide member 40 is pushed as the pin 68 is turned from the initial position 66a to the setup position 66b against pressure while the front fork 15 is contracted, the force applied to the front fork 15 on the side of contraction is released and further, force that pushes the slide member 40 is released. The pin 68 is then guided on the axial rear side of the slide member 40 by the pushing guide part 66c, turning from the setup position 66b to one side in the circumferential direction. Since the locking guide part 66d regulates the movement of the pin 68 to one side in the circumferential direction when the fitting part 40a is fitted into the fitting hole 58 in this state, the predetermined contraction percentage of the front fork 15 is held. In addition, since the pin 68 is guided to the initial position 66a by the locking guide part 66d when the fitting of the fitting part 40a into the fitting hole 58 is released when the front fork 15 is contracted more than the predetermined contraction percentage, the extension of the front fork 15 is not regulated again after extension regulation is released. That is, the guide mechanism 64 obstructs the movement of the slide member 40 in a direction fitted to the inner tube 37 unless the turning member 67 is turned in a state in which the fitting of the slide member to the inner tube 37 is released.

On the outer periphery of the slide member 40, a groove 70 extends axially with one end being open to the outer end of the slide member 40 to fit the pin 68 into the guide groove 66 in an assembly. A coupling groove 71 is provided for coupling an inner end of the groove 70 to the setup position 66b of the guide groove 66.

The axial outer end of the slide member 40 projects from the supporting member 39 to prevent the outer end of the slide member 40 from having an effect upon a steering operation. The holding device 38 is attached to one or both outer tubes 36 in the front fork 15 in a position in which an extended line of the axis of the slide member 40 is separated from the body frame F toward the rear side.

The following is an explanation of the operation of this embodiment, since the holding device 38 is provided with the automatic release mechanism 57 that automatically releases an extension regulation when the front fork 15 is contracted more than the predetermined contraction percentage. The re-regulation prohibiting device 65 prohibits re-regulation during operation after the release of an extension regulation by the operation of the automatic release mechanism 57. The extension regulation is automatically released by the automatic release mechanism 57 when the front fork 15 is contracted more than the predetermined contraction percentage after the motorcycle is started. Operations, except steering operations, are not required during operation of the vehicle. In addition, a part such as a lever and a cable is not required. Further, as re-regulation during operation after extension regulation is released and is prohibited by the function of the re-regulation prohibiting device 65, a state in which the predetermined contraction percentage is released can be securely maintained during operation after the extension regulation is released.

The front fork 15 is provided with the outer tube 36 supported by the body frame F and the inner tube 37 fitted to the outer tube 36 from the downside so that the inner tube can slide. The holding device 38 is provided with the supporting member 39 attached to the outer tube 36 so that the supporting member can be detached. In addition, the slide member 40 pierces the outer tube 36 and is supported by the supporting member 39 so that the slide member can be slid. At the end of slide member 40 the fitting part 40a is provided that can be fitted to the inner tube 37. The automatic release mechanism 57 is configured by the fitting hole 58 into which the fitting part 40a of the slide member 40 is inserted and fitted when the front fork 15 is at the predetermined contraction percentage. The fitting hole has a shape enabling releasing of the fitting of the fitting part 40a when the front fork 15 is contracted more than the predetermined contraction percentage as well as the first and second springs 59, 60 that press the slide member 40 on the side opposite the fitting hole 58.

Figure 13:
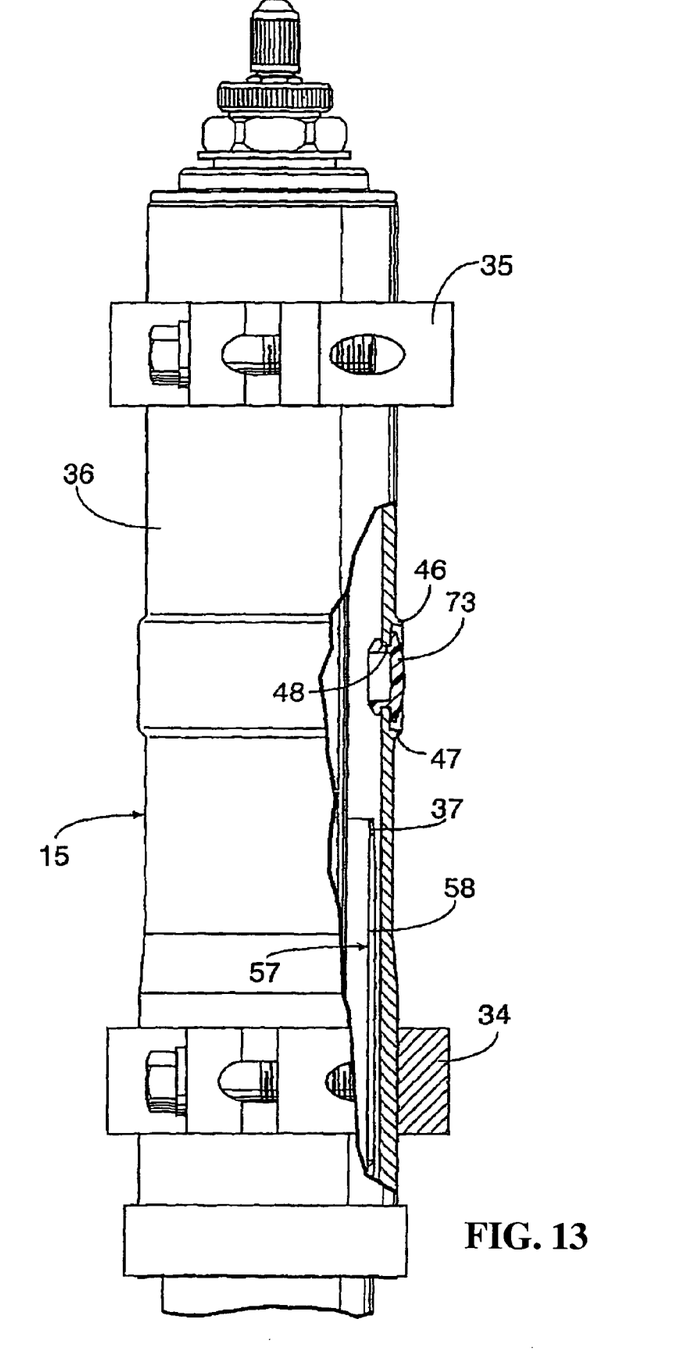
FIG. 13 corresponds to FIG. 4 and shows a condition in which the holding device is detached.

Therefore, the holding device 38 can be attached to the front fork 15 so that the holding device can be detached and the holding device 38 can be detached in general during operation except a race. At this time, as shown in FIG. 13, dust and water can be prevented from entering the outer tube 37 by mounting a lid member 73 for closing the through hole 48 provided on the outer tube 36.

Since the front fork 15 is held at the predetermined contraction percentage by inserting and fitting the fitting part 40a into the fitting hole 58 provided to the inner tube 36 and the slide member 40 is slidably supported by the supporting member 39 attached to the outer tube 36 so that the supporting member can be detached, the attachment and the detachment of the holding device 38 are easy.

Further, the slide member 40 having a circular cross section can be slid between the forward position, where the fitting part 40a is inserted into the fitting hole 58, and the rearward position where the fitting part 40a is located outside the outer periphery of the inner tube 37 and is fitted to the supporting member 39 so that the slide member can be slid without rotation. The re-regulation prohibiting device 65 is provided with the slide member 40, the turning member 67 and the guide mechanism 64 provided between the slide member 40 and the turning member 67 for determining an axial position of the slide member 40 according to the turning of the turning member 67. The guide mechanism 64 is configured in structure wherein the movement of the slide member 40 in an axial direction toward the inner tube 37 is prevented when the turning member 67 is not turned in a state in which the fitting of the slide member 40 to the inner tube is released. The re-regulation prohibiting device 65 can be configured simply and compactly.

In addition, the first and second springs 59, 60 urge the slide member 40 away from the fitting hole 58 are doubly arranged, and also press the turning member 67 in the circumferential direction, so that two functions can be fulfilled with a compact configuration acquired by reducing the number of parts. Thus, a secure operation can be realized.

For example, in the above-mentioned embodiment, the motorcycle is described, however, the invention can also be applied to a three-wheeled vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A suspension restraint device, comprising:
   a telescopic suspension having an outer tube and an inner tube, the outer and inner tube movable relative to one another and having a contracted and expanded position;

an aperture in the outer tube, and a slide member extending through the aperture in the outer tube and engaging the inner tube to maintain the tubes in the contracted position; and a supporting member extending from the outer tube, the slide member retained within the supporting member; and a first groove formed in the slide member; a turning member surrounding the slide member; a first pin extending from the turning member and fitting with the first groove, wherein the first groove has a set up position and a locking part position; and the slide member has a forward position and a rearward position, the first pin in the locking part position and the slide member engaging the inner tube when the slide member is in the forward position, the first pin in the set up position and the slide member disengaged from the inner tube when the slide member is in the rearward position; and a second groove formed in the slide member and a second pin extending from the supporting member and fitting within the second groove.

2. The suspension restraint device of claim 1, further comprising:

an auto release comprising
a spring biasing the slide member outwardly; and
a key way in the inner tube.

3. The suspension device of claim 2, further comprising:
a fitting part extending outwardly from the slide member; and
the key way having a wide portion and a narrow portion.

4. A vehicle, comprising:
at least one front wheel, a telescopic suspension attached to the at least one front wheel, the telescopic suspension having an outer tube and an inner tube, the outer and inner tube movable relative to one another and having a contracted and expanded position;

an aperture in the outer tube, and a slide member extending through the aperture in the outer tube and engaging the inner tube to maintain the tubes in the contracted position; and a supporting member extending from the outer tube, the slide member retained within the supporting member; and a first groove formed in the slide member; a turning member surrounding the slide member; a first pin extending from the turning member and fitting with the first groove, wherein the first groove has a set up position and a locking part position; and the slide member has a forward position and a rearward position, the first pin in the locking part position and the slide member engaging the inner tube when the slide member is in the forward position, the first pin in the set up position and the slide member disengaged from the inner tube when the slide member is in the rearward position; and a second groove formed in the slide member and a second pin extending from the supporting member and fitting within the second groove.

5. The suspension restraint device of claim 4, further comprising:

an auto release comprising
a spring biasing the slide member outwardly; and
a key way in the inner tube.

6. The suspension device of claim 5, further comprising:
a fitting part extending outwardly from the slide member; and
the key way having a wide portion and a narrow portion.

* * * * *